Patented Feb. 10, 1942

2,272,672

UNITED STATES PATENT OFFICE 2,272,672

WATER FLOODING OF OIL FIELDS

Harvey T. Kennedy, Forest Hills, Pa., assignor to Gulf Research & Development Company, Pittsburgh, Pa., a corporation of Delaware No Drawing. Application March 23, 1936, Serial No. 70,542

6 Claims. (Cl. 166—21)

This invention relates to water flooding of oil fields; and it comprises an improved process of oil production by water flooding of oil well strata of differing porosities or permeabilities wherein suitable material adapted to impregnate the pores of the strata is injected through one or more input wells into the strata in quantity sufficient to diminish in a desired degree the permeability of the strata and thus to reduce or prevent by-passing of water to production wells and the water flooding is then continued, advantageously at increased pressure; the impregnating materials used being advantageously solutions of certain metallic salts and these solutions being so injected as to form precipitates in the pores of the strata; all as more fully hereinafter set forth and as claimed.

The deliberate water flooding of an oil field for the purpose of reviving the production of oil therefrom after depletion was first practiced in the Bradford field; the results of water flooding being a several fold increase in the rate of production of the wells in the flooded region and in the total production. However, water flooding has not as yet come into general use because of difficulties encountered in the by-passing or channeling of water, resulting in the flow of many volumes of water into the production wells for each volume of oil produced.

In the present invention, the difficulty due to by-passing of water is minimized. I have found it possible to effect a differential reduction of permeability in strata of differing porosities by injecting into the strata materials impregnating their pores. While it might appear that the injection into the oil bearing strata of a material which obstructs the flow of liquid through the strata would lower the efficiency of the water flooding process by increasing the pressure required, I have found however that the net effect of injecting obstructing materials into the strata is usually to increase the efficiency by decreasing the amount of water that must be pumped for a given quantity of oil expelled; increase of pressure raising the rate of oil expulsion. The production of oil is increased and the quantity of water pumped may be decreased.

Underground oil reservoirs almost always consist of layers of sand of widely differing permeability alternating with layers of shale or other impermeable rock. These "shale breaks" or "partings" differ in lateral extent. They extend over areas often as small as a few acres and sometimes as large as several square miles. The expulsion of oil by water flooding results from displacement of oil contained in the porous strata, each stratum acting as a unit and independently of all other strata. In the early flooding of a pool, the oil is ejected from the more permeable strata first, leaving the less permeable strata still largely saturated with oil except in zones near the input well through which the water is introduced. Subsequently, the volume of water which by-passes the oil, that is, which flows from the input well to the production well without expelling appreciable volumes of oil, is large because it is flowing through the looser or more porous strata and also because the viscosity of water is considerably lower than that of most oils. As the water flood breaks through the various strata in the order of their decreasing permeability, the water-oil ratio increases and finally reaches a point where flooding can no longer be continued profitably by present methods.

I have found that in an oil bearing formation being flooded, with by-passing of the water as described, when there is injected into the formation together with the water a substance which acts to plug the pores of the strata, the substance is distributed between the strata delivering water and those delivering oil in about the same ratio, substantially, as the water-oil ratio, the greater part of the impregnating material finding its way to the water carrying strata. Upon injection of the proper quantity of an obstructing agent, the average effective decrease in permeability is greater in the strata carrying water than in the strata delivering oil into the production well; the water-oil ratio being proportionately decreased. The advantage of the improved method of water flooding resides in this differential or preferential reduction of porosity due in considerable measure to the fact that as the viscosity of the oil produced is greater than that of the water introduced the rate of flow of the impregnating material into the oil producing strata is further reduced.

If, for example, the viscosity of the oil expelled from a given stratum happens to be ten times the viscosity of the water which displaces it, the pressure drop from the input well to the junction between the oil and water, for steady flow, will be one-tenth of that between this junction and the production well, assuming that the input well is receiving only water and the production well is receiving only oil from the stratum under consideration. Because of the fact that the pores of the oil bearing stratum can receive impregnating material carried by the water only in the sections where it is occupied by water and where, due to the comparatively low viscosity of water, the resistance to flow is small, it follows that the flow through the stratum delivering oil is but slightly diminished by impregnation. In the case of the stratum which carries only water from the input well to the production well, however, the flow is strictly proportional to the permeability. If by impregnation of the pores of this stratum its average effective permeability is cut down, say 80 per cent, the flow of water is cut down 80 per cent. And if now the water pressure maintained upon the input well is increased so that the same amount of water is taken into the reservoir as before, the flow of oil may be increased, roughly, five-fold. Actually, as I have found, since the oil bearing strata are but little obstructed, and this is offset through the forcing of more of the obstructing material into the strata which by-pass water (because of the resistance due to the viscosity of the oil in the oil bearing strata), the ratio of increase of flow of oil is about four to one and this four-fold increase in production is obtained by a five-fold expenditure of power. To obtain the same increase in oil flow by methods heretofore used would require sixteen times the power.

In carrying out my invention, I inject into the strata, either with the water used for flooding or by themselves, solutions acting to form precipitates in the pores or channels of the strata. Choice of precipitating materials, in general, depends upon the nature of the channels which must be obstructed and particularly on the chemical composition of the sand or rock strata to be impregnated. Thus if channels or pores are very large, a material suspended in the water, such as mud or clay, may suffice. If the pores to be filled are small, like those of a typical sandstone, mud or clay may fail to penetrate and may separate from the water at the face of the rock without effect upon the pores of the stratum. Generally I have found that the best results are obtained by injecting into the strata solutions of acid salts of metals such as chlorids or sulfates of iron, aluminum, antimony, arsenic and like metals; salts which react with components of the rock or sand formation to form precipitates and thus to impregnate the formation. In general, salts of a strong acid combined with a metal more electronegative than calcium are effective. With acid salts such as these, corrosion of pumps and piping may be prevented by the addition of suitable amounts of well known corrosion inhibitors. Calcium carbonate is a common constituent of the rocks which serve as oil reservoirs; the content of this substance often averaging about 10 per cent of the weight of the rock. It is usually an important rock constituent available for reaction with the metallic salts which I inject into the rock strata according to the present invention. Magnesium carbonate occurs in less amount as do other rocky materials of alkaline nature, such as pegmatities; these being also acted upon by salts of the above group to form precipitates. In carrying out my invention it is possible to analyze minerals present in the strata to be obstructed, ascertaining what chemical bodies are available, so that known reactions may be brought about to effect obstruction with its resulting benefits.

In some cases, by analyzing the various strata through which the input well passes, it has been found that the looser strata which first cause by-passing of water contain compounds which are not contained in the strata which deliver oil to the production well. In this event, a chemical compound may be injected which will plug off the by-passing stratum without materially affecting the oil bearing stratum. For example, analysis of rock cores from the input well may show that the formation consists of fine grained ferruginous sandstone, substantially free from material other than silica and iron oxid, alternating with strata of coarse calcareous sandstone. The calcareous sandstone being the coarser, it will be the first to deliver its oil to the production well and thereafter such a stratum will allow passage of water without expulsion of any substantial quantity of oil. To obstruct the calcareous sandstone without affecting the ferruginous sandstone, a quantity of ferric chlorid or ferrous sulfate is added to the water introduced in the proportion of about one pound of the salt to 100 gallons of water. This addition to the flowing water may be continued until the desired reduction in flow of water is accomplished. The pressure upon the supply of water may then be increased, increasing the oil production as previously described.

Instead of adding an impregnating agent to the flow of water introduced, I may force into the stratum a concentrated solution of a metallic salt, such, for example, as antimony trichlorid, which reacts with the water to form an insoluble precipitate in the strata such as antimony oxychlorid. In so doing, the concentrated reagent may be forced down the tubing preceded by a sliding wooden plug to prevent premature precipitation, and in quantity sufficient to impregnate the more porous strata, but not enough to force an undue amount of the metallic solution into the less porous oil bearing strata. If desired the well may be cleared of water prior to injection of the reagent, the plug not being used in such case. Or, I may alternately inject two solutions which are mutually precipitable, cleaning out the well between the injections of the two solutions so as to avoid precipitation in the well itself and consequent obstruction. For example, there may be successive injection of ferrous sulfate solution and a solution of an alkali, such as caustic soda or sodium carbonate. As other examples of mutually precipitant solutions may be mentioned those of iron or aluminum chlorid and ammonia or a fixed alkali; calcium chlorid and sodium carbonate; magnesium sulfate or chlorid and an alkali, etc. Or the precipitation of a ferrous salt may be accomplished with an oxidizing solution, such as water containing dissolved air with or without dissolved alkali. The characteristics of the formation often determine the solutions to be used. I may adopt the technique well known to operators of water-purification plants, in forming coagulated precipitates in hard water strata; adjusting conditions to those suitable for the particular stratum.

It is sometimes desirable to partially or completely remove a precipitate in the strata near an input well, as a method of correcting a condition brought about by too much obstruction. For this reason I prefer to utilize reactions resulting in precipitates which may be readily removed. For example, ferric or aluminum hydroxid obstructions may be removed by the injection of mineral acid, or of acid salts like ferric chlorid or aluminum chlorid.

In practice, an input well serves to flood a considerable territory extending radially from the well and production wells are advantageously located at various points surrounding an input well. A single input well may serve for injection of impregnating material to prevent by-passing of water into the surrounding production wells.

In a specific example of my process applied to a water-flooding operation, there were five wells arranged in a five-spot pattern: four production wells and a water input well in the center. The four production wells produced a total of 12 barrels of oil per day. In order to obtain this production it was necessary to pump 150 barrels of water per day into the input well. The water-oil ratio was thus 12.5:1. According to the invention the water input well was treated with a very thin mud containing about 2 pounds of silty mud per barrel of water, injected into the well under substantial pressure. This treatment for continued for 5 days, during which time the water input continually decreased until only 25 barrels of water per day were required, the same pressure being applied on the input well. The oil production continued unchanged. Thus the water-oil ratio was reduced to approximately 2:1. It is evident that during the treating process the very fine mud had gone mostly into water bearing strata, and that the mud which went into the oil bearing stratum decreased the flow to only a negligible extent. After the five day treatment with the mud slurry water was again used on the input well with a continuation of the beneficial results.

What I claim is:

1. In a water flooding process wherein water is injected into porous strata of various permeabilities surrounding an input well and water and oil are removed from a production well, the process which comprises injecting into the said input well in solution at least one substance which reacts with at least one component of the porous strata to form a plugging precipitate partially obstructing the pores thereof in the portions of the strata adjacent the input well, and resuming injection of water into the input well.

2. In a water flooding process wherein water is injected into porous strata of various permeabilities surrounding an input well and water and oil are removed from a production well, the process which comprises injecting into the said input well a solution of a substance adapted to form a precipitate partially obstructing the several porous strata adjacent the input well, said substance being an acid salt of a metal selected from the class consisting of iron, aluminum, arsenic, antimony and tin, and resuming injection of water into the input well.

3. In a water flooding process wherein water is injected under pressure into porous strata of different permeabilities surrounding an input well and water and oil are removed from a production well, the process which comprises injecting into said input well successively two liquids containing substances adapted to react together to form a precipitate partially but not completely obstructing the pores of the various differently permeable strata adjacent the input well, and then resuming injection of water.

4. In a water flooding process wherein water is injected into porous strata of various permeabilities surrounding an input well and water and oil are removed from a production well, the process which comprises injecting into the said input well a solution, capable of penetrating far into porous rock, of a substance adapted to form a dislodgment-resisting precipitate within the pores of the strata partially obstructing the several porous strata adjacent the input well, and then resuming injection of water into the input well.

5. A process for recovering oil from porous strata in regions having porous strata of different permeabilities, which comprises establishing and maintaining a water input well down which a drive liquid is forced under pressure into surrounding strata, establishing and maintaining an oil output well spaced from the input well and from which oil and drive liquid are withdrawn, and injecting into the input well and the adjoining strata a thin, temporarily fluid, pore-penetrating sealing material, which material in the course of time produces in the pores thereof a dislodgment-resisting seal, the amount of material injected being limited to cause only a partial obstruction of the several strata adjacent the input well, and resuming injection of the drive liquid.

6. The method of claim 3 wherein the two liquids are solutions of calcium chloride and sodium carbonate, respectively.

HARVEY T. KENNEDY.